United States Patent [15] 3,684,208
Larsen [45] Aug. 15, 1972

[54] COAXIAL REEL TAPE TRANSPORT SYSTEM

[72] Inventor: Raymond B. Larsen, Riverton, Wyo.

[73] Assignee: Datel Corporation, Falls Church, Va.

[22] Filed: April 24, 1970

[21] Appl. No.: 31,527

Related U.S. Application Data

[63] Continuation-in-part of Ser. No. 765,839, Oct. 8, 1968, Pat. No. 3,552,685.

[52] U.S. Cl. ..................242/188, 242/194, 274/11 C
[51] Int. Cl. .....B65h 59/38, G03b 1/04, G11b 15/32
[58] Field of Search .........................242/55, 19 A, 193, 194, 197, 210, 242/75.5, 188; 274/4 C, 11 C

[56] References Cited

UNITED STATES PATENTS

| | | | |
|---|---|---|---|
| 3,043,531 | 7/1962 | Sinkewitsch | 242/198 X |
| 3,252,669 | 5/1966 | Geri | 242/194 |
| 3,497,157 | 2/1970 | Hanes et al. | 242/188 |
| 3,552,685 | 1/1971 | Larsen | 242/194 |

*Primary Examiner*—Leonard D. Christian
*Attorney*—Reilly and Lewis

[57] ABSTRACT

A tape cartridge contains coaxial supply and take-up reels with a spring drive which is cooperative with a tape tensioner on a tape deck to maintain substantially constant tension on the tape as it is threaded past a read/write head. A guide roller assembly disposed internally of the tape cartridge guides the tape across the head without binding or stretching and without necessitating removal of the tape from the cartridge. A top-loading housing on the tape deck facilitates insertion of the tape cartridge into alignment with the read/write head, capstan drive and tape tensioner member. Photosensors are provided within the housing to sense the beginning and end of the tape, and a control button on the tape cartridge may be advanced to a position to prevent accidental erasure of information on the tape.

10 Claims, 11 Drawing Figures

INVENTOR
RAYMOND B. LARSEN
BY
ATTORNEYS

COAXIAL REEL TAPE TRANSPORT SYSTEM

This application is a continuation-in-part of my copending application for patent entitled "TAPE TRANSPORT ASSEMBLY," Ser. No. 765,839, filed Oct. 8, 1968, now U.S. Pat. No. 3,552,685.

This invention relates to novel and improved tape transport systems, and more particularly relates to a coaxial reel tape transport system for the high-speed storage and retrieval of information on a sound recording and reproducing medium, such as, magnetic tape in a digital processing system.

Coaxial reel tape transport systems previously have been devised wherein tape reels are mounted for rotation about a common shaft, and a constant torque spring is interpositioned between the reels to minimize external drive motor requirements in winding and unwinding the tape onto and from the reels. For example, a typical coaxial reel tape cartridge is shown in the patent to Bygdnes U.S. Pat. No. 2,996,264 in which a constant torque spring, commonly referred to as a Neg'ator spring, is utilized to maintain constant tension on the tape notwithstanding differential speeds of rotation of the supply and take-up reels in winding and unwinding the tape. In systems of this type, it is advantageous to accurately align and guide the tape past the read/write head without necessitating its removal from the cartridge; and in such a way as to prevent binding, stretching or distortion. For this purpose, a guide roller assembly is mounted internally of the tape cartridge and is so constructed and arranged as to permit direct movement of the tape in advancement between the reels along a predetermined guide path. Further, the tape cartridge is designed to facilitate insertion and removal of the tape cartridge with respect to a housing on a tape deck which is provided with the necessary capstan drive, read/write herd and taper tensioner, sensing means to signal the beginning and end of the tape and a protection switch to prevent accidental erasure of information on the tape.

It is therefore an object of the present invention to provide a novel and improved coaxial tape transport system in which a tape is accurately guided between self-driven coaxial reels for the purpose of storage and retrieval of information.

It is another object of the present invention to provide in a tape transport system for a novel and improved guide roller assembly disposed internally of a tape cartridge which is capable of advancing a tape between a pair of coaxial tape reels for recording or reproducing information on the tape without its removal from the tape cartridge.

A still further object of the present invention is to provide a tape deck provided with a housing thereon which facilitates loading of a tape cartridge into position as well as ease of unloading and replacement in a rapid dependable manner; and specifically wherein the tape deck includes means associated with the housing for sensing the beginning and end of the tape as it is wound onto and from the coaxial tape reels as well as means to protect the tape against accidental erasure.

An additional object and feature of the present invention is to provide a coaxial reel tape cartridge which is compact, highly simplified in construction and economical to manufacture, assemble and maintain; and further wherein the cartridge is designed for use in cooperation with a housing on a tape deck to assure maximum protection for the tape as it is advanced between the reels for accurate storage and retrieval of information thereon.

In accordance with the present invention, a preferred form of tape transport system has a pair of coaxial reels mounted within a tape cartridge with a series of guide rolls positioned internally of the tape cartridge to guide a magnetic tape between the reels in a straight line across an open end of the cartridge without binding or distortion of the tape. Since the tape must necessarily follow an inclined path of travel between the coaxial supply and take-up reels, the guide rolls are so positioned as to cause the tape to follow a straight path across the open end while inclining in opposite directions away from the supply reel and onto the take-up reel, without binding or distortion, over a relatively short path of travel. Preferably the coaxial tape reel drive is of the type employing a constant torque spring so as to maintain constant tension on the tape across the open end of the housing; and, for instance, the spring drive may be of the type disclosed in the patent to Bygdnes U.S. Pat. No. 2,996,264 with an improved spring mounting between the reels to provide a more compact and efficient spring drive.

The tape cartridge is specifically adapted for use in association with a novel and improved tape deck which includes a tape cartridge-receiving housing on its upper platform surface, the housing being of the top-loading type with an upwardly directed guide passage for insertion and removal of the tape cartridge. When the tape cartridge is inserted into the housing it is automatically guided into engagement with a transducer, a capstan drive and a tape tensioner mounted within the housing with the open end of the tape cartridge being urged in a direction to cause the transducing element to contact the tape passing across the open end of the cartridge, the capstan drive forcing the tape against a pinch roller mounted within the cartridge to cooperate in advancing the tape across the transducing element; and the tape tensioner is arranged to yieldingly urge the tape ahead of the transducing element to cooperate with the spring drive in maintaining substantially constant tension on the tape.

Additional features of the tape cartridge and deck making up the tape transport system of the present invention include incorporation of a dust shield within the tape cartridge between the reels and open end of the cartridge, photosensors within the housing and the tape deck to sense the beginning and end of the tape and a failsafe protection switch on the cartridge to prevent accidental erasure of information on the tape.

These and other objects, advantages and features of the present invention will become more readily comprehended and understood from a consideration of the following detailed description when taken together with the accompanying drawings, in which.

Figure 1:
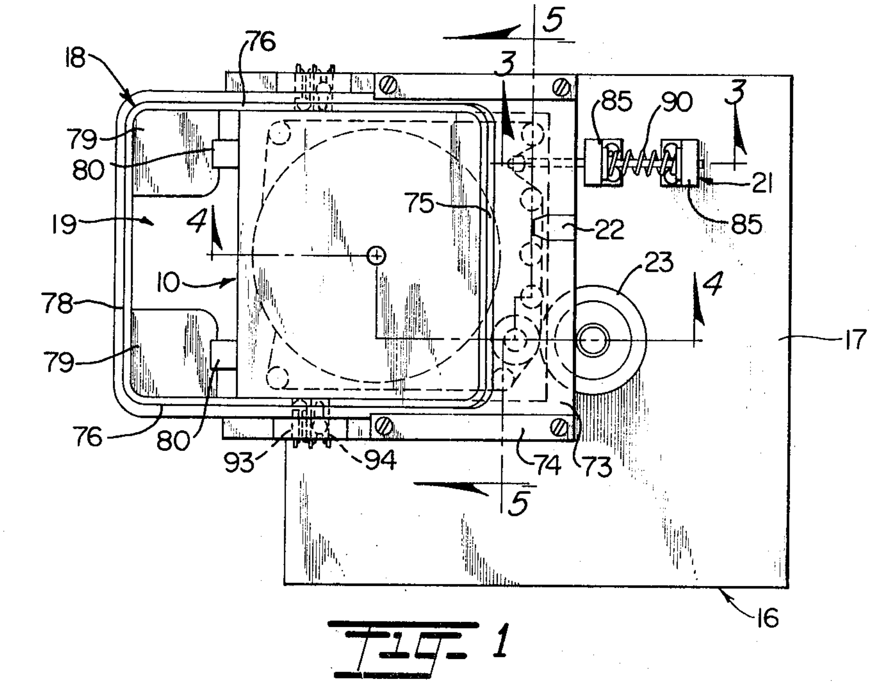
FIG. 1 is a top plan view of a preferred form of tape transport system in accordance with the present invention.

Referring in more detail to the drawings, there is shown in a preferred form of tape transport system a tape cartridge 10 containing a pair of coaxial take-up and supply reels 11 and 12 supported for rotation within the housing on a common spindle 14. Broadly, in the form shown, a magnetic tape T is guided between the supply and take-up reels across an open or exposed end 15 of the tape cartridge. As best seen from the assembly views of FIGS. 1 to 5, a tape deck 16 is specifically adaptable for use in reading and writing information on the tape as it passes across the open end of the cartridge, the tape deck having an upper platform surface 17 upon which is mounted a housing 18. The housing has an upwardly directed guide opening 19 to receive the tape cartridge, the open end 15 of the tape cartridge being aligned with an open side 20 of the housing, and a tape tensioner 21, transducing element 22 and a capstan drive 23 are stationed on the platform 17 along the open side 20 of the housing.

For a more detailed consideration of the construction and arrangement of the tape cartridge and coaxial reel assembly mounted therein, reference is made to FIGS. 4 to 9 wherein the tape cartridge is of generally rectangular configuration having top and bottom walls 24 and 25 disposed in spaced parallel relation to one another by opposite side walls 26 and 27 and a rear end wall 28. The shaft or spindle 14 projects upwardly from the bottom wall 25 and is affixed to the top wall by suitable means such as a screw 29; and as previously stated the end 15 of the tape cartridge opposite to the rear end wall 28 is open across its substantial extent to permit access to the tape.

Figure 4:
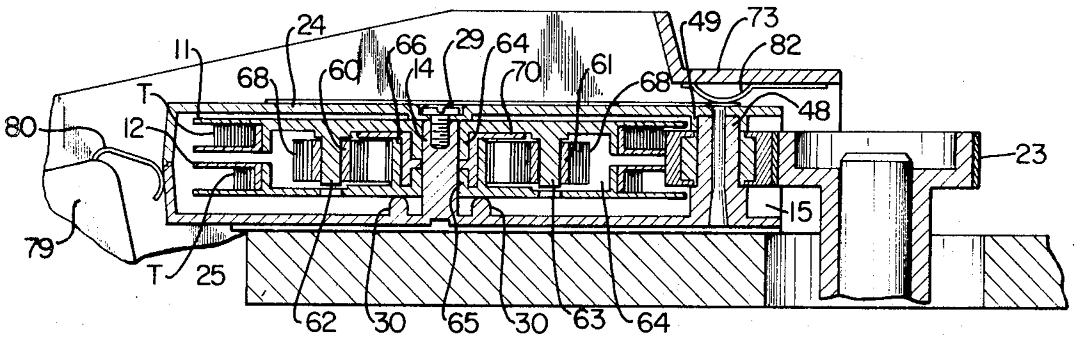
FIG. 4 is a sectional view taken about lines 4—4 of FIG. 1.
Figure 6:
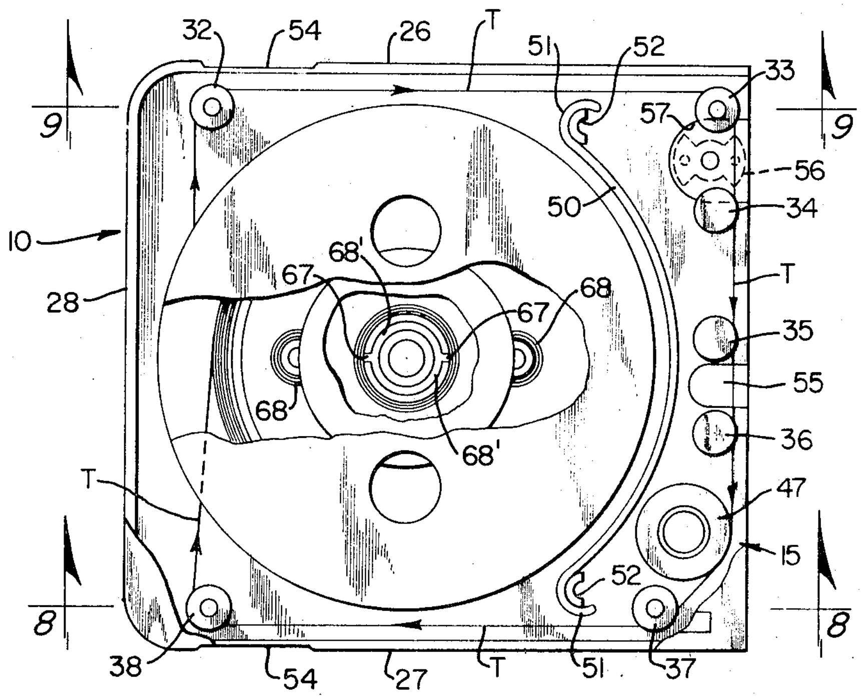
FIG. 6 is an enlarged plan view of the preferred form of tape cartridge shown in FIG. 1 with portions broken away and others shown in section.
Figure 9:
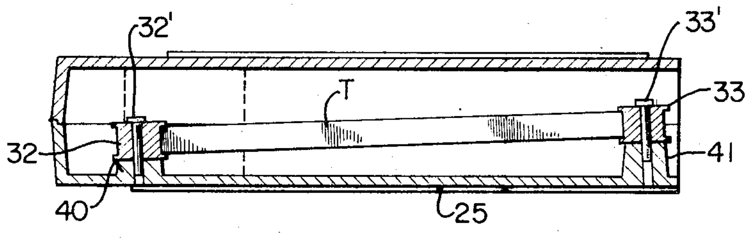
FIG. 9 is a sectional view taken on lines 9—9 of FIG. 6 and illustrating the path of travel of the tape across the opposite side of the cartridge.

As shown in FIG. 4, the reels 11 and 12 are supported for rotation on the shaft 14 in spaced relation to the bottom wall 25 by upwardly directed protuberances 30 located at diametrically opposed sides of the base of the shaft 14 and which preferably extend circumferentially in outer spaced concentric relation to the shaft. A guide roll assembly is positioned internally of the cartridge to form a controlled guide path for the tape in its advancement in either direction between the reels across the open end of the cartridge. Assuming that the tape is to be advanced in the direction of the arrows, as illustrated in FIG. 6, the tape is removed from the lower supply roll across a first guide roll 32 at a rear corner of the cartridge forwardly along an upwardly inclined guide path across guide roll 33 at the front corner then is advanced horizontally across a series of guide pins 34, 35, 36 and a guide roll 37 along the open end of the tape cartridge. From the guide roll 37, the tape is advanced rearwardly along another upwardly inclined guide path across guide roll 38 at the other rear corner of the cartridge onto the upper take-up reel 11. Specifically, the guide rollers 32, 33, 37 and 38 at the four corners of the tape cartridge are in the form of cylindrical pulleys each journaled to be freely rotatable on a drive pin inserted through central openings in bosses projecting upwardly from the bottom wall 25 of the tape cartridge. Referring for example to FIG. 9, the guide roller pulleys 32 and 33 are mounted on drive pins 32' and 33', respectively, and the drive pins in turn are inserted through central bores formed in bosses 40 and 41, respectively. The bosses 40 and 41 as well as their bores are inclined rearwardly at an acute angle to the reel axis, the boss 41 being longer than the boss 40 with its upper surface in an inclined plane passing through the upper surface of the boss 40 so that the guide pulleys 32 and 33 will form an upwardly inclined guide path for the tape drawn off of the lower supply reel 12. Additionally, the lower side of the upper surface of the boss 40 is in substantial horizontal alignment with the bottom flange of the supply reel so that the tape will be drawn off the supply reel in a horizontal direction over the surface of the pulley 32.

In turn, the tape guides 34, 35 and 36 are positioned on axes parallel to the reel axis by extension pins 34', 35' and 36' inserted through bores in the three spaced bosses 42 projecting upwardly from the bottom wall 25 across the open end of the cartridge. The bosses 42 are correspondingly dimensioned with their upper surfaces even with the upper side of the boss 41 so that the tape surface is vertically disposed as it is advanced horizontally across the open end of the cartridge.

The guide roller pulleys 37 and 38 along the side 26 of the tape cartridge opposite to the rollers 32 and 33 are journaled by pins 37' and 38', respectively, inserted through forwardly angled bores in bosses 44 and 45, respectively. The bosses 44 and 45 are correspondingly inclined forwardly so that the guide pulleys 37 and 38 will establish an upwardly inclined guide path for the tape in advancing rearwardly from the open end of the cartridge onto the take-up reel. The front edge of the boss 44 is horizontally aligned with the upper surfaces of the bosses 42, and the rear edge of the boss 45 is aligned with the bottom flange of the upper take-up reel 11 so that the tape follows a horizontal path of travel across the guide pulley 38 as it is wound onto the take-up reel 11. As a result, the tape undergoes minimum bending as it is advanced through a relatively short path of travel internally of the cartridge with its path of travel across the open end of the cartridge parallel to the reels while inclining in equal but opposite directions toward and away from the open end of the cartridge.

Figure 7:
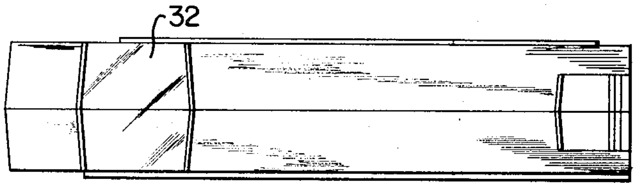
FIG. 7 is a side elevational view of the tape cartridge shown in FIG. 6.
Figure 8:
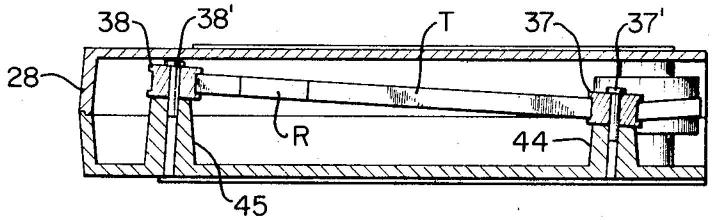
FIG. 8 is a sectional view taken about lines 8—8 of FIG. 6 with portions omitted to illustrate the path of travel of the tape across one side of the cartridge.

A pinch roller 47 is also mounted internally of the cartridge between the tape guide 36 and guide pulley 37, the pinch roller preferably formed of a cylindrical roll of rubber or rubber-like material journaled for rotation on an inwardly stepped, surface portion of an enlarged boss 48 projecting upwardly from the bottom wall 25, and the upper end of the boss is snugly inserted within a circular cap 49 projecting downwardly from the top wall 24. Located just inwardly of the pinch roller between the open end of the cartridge and the reels is an arcuate dust shield 50 which is disposed in upright relation with opposite curved end portions 51 molded into position as indicated at 52. Transparent windows 54 are formed in opposite sides of the cartridge adjacent to the rear end wall 28 to permit sensing of reflective marks R, as shown in FIG. 7, at the beginning and end of the tape by photosensors associated with the tape deck and to be hereinafter described. Additionally, a guide slot 55 is formed in the bottom wall of the tape cartridge adjacent to its front edge and a two-position rotary control button 56 is mounted within a shallow recess 57 located in the bottom wall 25 of the cartridge between the guide rolls 33 and 34.

In order to maintain substantially constant tension on the tape as it is driven between the supply and take-up reels, specifically in such a way as to compensate for differences in the relative speed of rotation between the tape reels, a constant torque spring is interposed between the reels, as shown in FIGS. 4 and 6. Broadly, the constant torque spring system is of the type set forth and described in U.S. Pat. No. 2,996,264 and for a detailed consideration and comprehension of the system reference is made to that patent. In accordance with the present invention, however, an improved assembly of the spring system between the reels is provided, specifically wherein a pair of spring drums 60 and 61 are journaled on spring reel posts 62 and 63 projecting downwardly from the inner surface of the upper reel into a common cavity 64 which is formed between the reels, the posts being located diametrically opposite to one another on opposite sides of the central shaft 14. A bushing 64 projects downwardly from the upper reel 11 and a bushing 64 projects upwardly from the lower reel 12, and the bushings are disposed in surrounding relation to the central shaft 14. A spring motor hub 66 projects upwardly from the bottom reel 12 in outer spaced concentric relation to the bushing portions 64 and 65 leaving an annular space therebetween, and the hub is provided with diametrically opposed vertical slots 67. A Neg'ator spring or other coiled flat spring 68 is wound about each of the spring drums 60 and 61 with the free ends of the springs wound in a bifilar manner about the spring motor hub 66, the inner extremities 68' of the springs being inserted through the slots 67 and affixed to the inner surface of the spring motor hub. Preferably, the inner extremities 68' are clamped within the spring motor hub by a circular spring lock 70 which is generally L-shaped in cross section, one side of the lock inserted in close-fitting relation between the spring motor hub 66 and the inner bushings 64 and 65 and the other side of the lock extending horizontally across the upper edges of the spring 68. As the tape is advanced between the reels, the supply reel is rotated to cause the spring motor hub 66 to rotate and to transmit torque through the springs 68 to the spring motor drums whereby to drive the take-up reel and wind up the tape from the supply reel. Under rotation, the springs will be wound upon their respective drums and tend to unwind from their respective drums according to the relative speeds of rotation between the reels in order to maintain substantially constant tension at all times and minimize introduction of slack into the tape on the take-up side.

Figure 5:
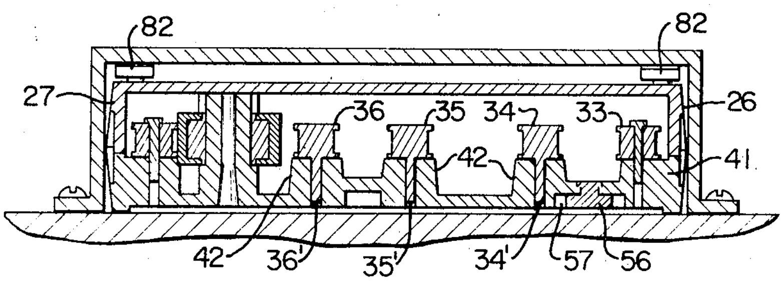
FIG. 5 is still another sectional view taken about lines 5—5 of FIG. 1.

As stated, the tape deck 16 is particularly adapted for use in reading and writing information on the magnetic tape T as it is advanced internally of and across the open end of the tape cartridge. In its preferred form, the housing 18 is generally rectangular in configuration and is made up of opposite side panels 72, a top wall 73 extending between the front portions of the side panels 72 so as to form with the side panel the open side 20 of the housing, and outwardly directed flanges 74 at the bases of the side panels are bolted or otherwise suitably secured to the platform 17 of the tape deck. The guide opening 19 for insertion of the tape cartridge into the housing is defined by a rearwardly inclined front wall 75 projecting upwardly from the back edge of the top wall 73, downwardly sloping side walls 76 and a rear wall 78. Pedestals 79 are located at the rear corners of the housing beneath the rear wall 78, and each pedestal is provided with a capstan pressure spring in the form of a leaf spring 80 projecting forwardly and slightly downwardly from the upper edge of its pedestal into the open space formed within the rear section of the housing. Additionally, as shown in FIGS. 4 and 5, cartridge hold-down means in the form of leaf springs 82 are affixed to the undersurface of the top wall 73 and are bowed downwardly somewhat to yieldingly engage the top surface of the tape cartridge when inserted into the housing as the leaf springs 80 exert pressure against the rear end of the tape cartridge to urge the surface of the pinch roller against the cylindrical surface of the capstan drive 23.

Figure 2:
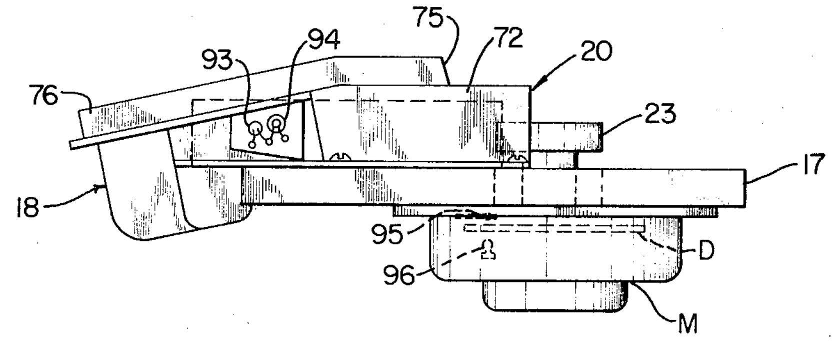
FIG. 2 is a side elevational view of the system illustrated in FIG. 1.

The transducing element, or read/write head 22, and the capstan drive 23 both are of conventional construction being spaced slightly above the platform 17 and disposed to project inwardly through the open side 20 of the housing in alignment with the surface of the back of the tape T as the latter is advanced across the open end of a tape cartridge inserted in the housing. As represented in FIG. 2, the capstan tape drive is provided with a motor designated M affixed to the undersurface of the platform 17, the cylindrical surface 23' of the capstan drive serving to press the tape against the surface of the pinch roller so that under rotation the capstan drive will advance or thread the tape past the read/write head 22. The tape tensioner assembly 21, in turn, as best seen from FIG. 3, includes a plunger arm 84 slidably mounted in a pair of horizontally spaced upright posts 85 for forward extension and projection of a roller 86 through the open end of the cartridge between the guide rolls 33 and 34 into yielding engagement with the magnetic tape directly ahead of its advancement across the read/write head. The roller 86 is journaled for rotation on a vertical axis defined by pin 87 which is mounted within a bifurcated end 88 at the free end of the tensioner arm 84. The posts 85 are affixed to the platform 17 and a coiled compression spring 90 is disposed in surrounding relation to the arm between the posts with a snap ring 91 inserted in a groove at the end of the arm to limit forward urging of the roller 86 in cooperation with a spring stop 92 at the forward end of the spring 90. Here the spring 90 cooperates with the constant torque spring drive for the coaxial reels to maintain constant tension on the tape as it is advanced across the read/write head; and for this purpose the spring 90 is given a spring constant such that the roller will force the tape inwardly between the guide rolls 33 and 34 only to the degree necessary to remove any slack in the tape.

Figure 3:
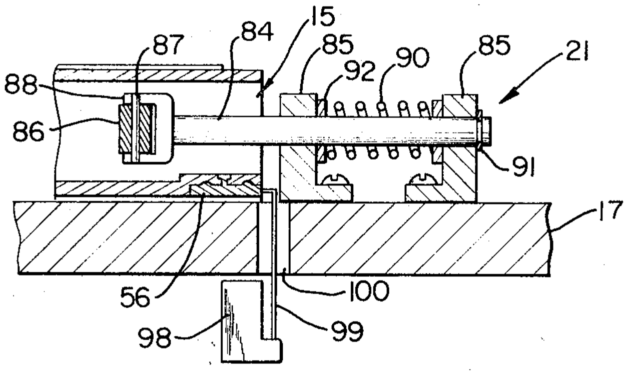
FIG. 3 is a fragmentary sectional view of the system taken about lines 3—3 of FIG. 1.

In use, the guide passage 19 at the rear end of the housing will permit the tape cartridge to be readily inserted into the housing by tilting the exposed end of the cartridge downwardly at a slight angle and advancing it forwardly until the rear end of the cartridge has cleared the pedestals 79 and is aligned with the front edges of the pressure springs 80. The cartridge is then snapped into place by pressing its rear end downwardly against the platform surface 17 with the hold-down springs 82 urging the exposed end of the cartridge against the platform surface and the pressure springs 80 together exerting a uniform pressure against the rear end wall surface of the cartridge so as to yieldingly urge the pinch roller forwardly against the surface of the capstan drive. In the loaded position described, the transparent windows 32 are aligned with photosensor cells 93 and light sources 94 mounted in opposite sides 72 of the tape deck housing, the photosensors being employed to sense the reflective marks R at the beginning and end of the tape. Another photosensor 95 and light source 96 are positioned directly beneath the tape deck on opposite sides of a timing disk represented at D to sense and control the speed of the motor M in the manner set forth in my copending application for U.S. Letters Patent entitled DIGITAL PULSE MOTOR CONTROL CIRCUIT, Ser. No. 680,086, filed Nov. 2, 1967, now U.S. Pat. No. 3,514,679. As represented in FIG. 3, a file protect switch 98 includes a switch arm 99 extending upwardly through opening 100 in the tape deck for engagement with the switch control button 56. The file protect switch 98 is a conventional two-position switch to provide a control signal for the purpose of preventing accidental erasure of information on the tape. Accordingly, when the control button 56 is in the position illustrated in FIG. 5, the arm 99 is held in a position closing the switch 98 to enable the erasure of information. If the button 56 is rotated 90° the switch arm 99 is permitted to advance inwardly to open the switch 98, thus disabling the write or erasure circuitry.

Figure 10:
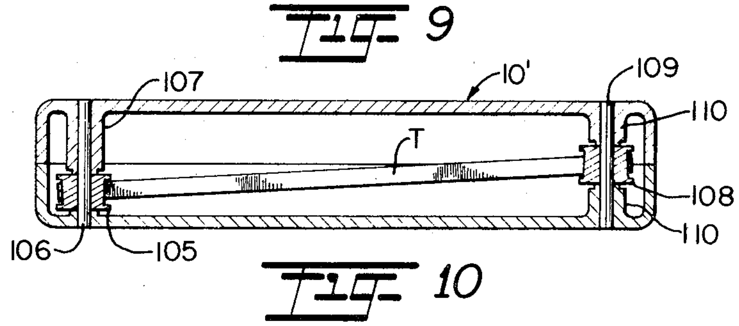
FIG. 10 is another sectional view similar to FIG. 8 of a modified guide roll assembly for guiding the tape across one side of the tape cartridge.

From the foregoing it will be appreciated that the tape transport system of the present invention provides a compact, failsafe system for reading and writing information on tape through utilization of a coaxial reel tape cartridge which in cooperation with a tape deck permits storage and retrieval of information without removal of the tape from the cartridge and while maintaining constant tension on the tape through the cooperative use of the constant torque spring drive between the reels and the tape tensioner assembly on the tape deck. The guide roller assembly described permits advancement of the tape horizontally across the open end of the cartridge in a direction parallel to the plane of the reels thereby minimizing the open space needed at the end of the cartridge and providing utmost protection for the tape without binding or distortion in passing between the reels. It will be evident here that modifications may be made in the specific disposition, construction and arrangement of the guide rolls, for example, as illustrated in the modified form of guide roll assembly shown in FIGS. 10 and 11. Here, a lower, corner guide pulley 105 is journaled for rotation on a pin 106 and is positioned by a spacer 107 so as to be aligned with the lower tape reel and permit the tape to pass horizontally from the lower reel across the guide pulley 105. In this form, the external surface of the guide 105 is substantially in the form of a truncated cone and is given a downward taper so that the tape is caused to incline upwardly from the guide 105 toward a front corner guide pulley 108 which is journaled on a pin 109 intermediately between upper and lower spacers 110 at a point midway between the upper and lower reels and in horizontally aligned relation to a series of tape guides positioned across the exposed end of the cartridge. Although not shown in the modified form, the tape guides may correspond to the tape guides 34, 35 and 36 illustrated in FIG. 5.

Figure 11:
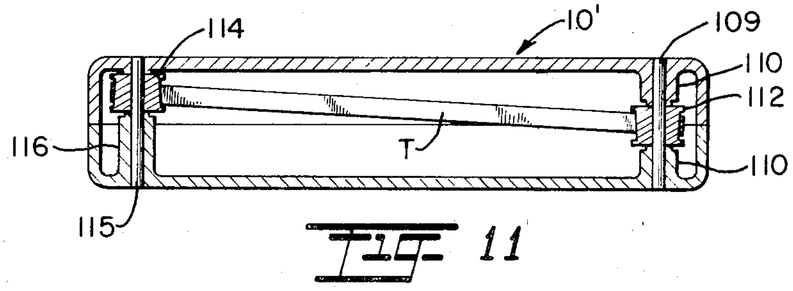
FIG. 11 is a sectional view of modified guide rolls, as shown in FIG. 10, for guiding the tape across the opposite side of the tape cartridge.

As shown in FIG. 11, an opposite front corner guide pulley 112 is mounted in a similar fashion to that of guide pulley 108 on a pin 109 and intermediately between upper and lower spacers 110. However, the taper on the guide 112 is reversed to that of guide 108 thereby permitting the tape to move upwardly across the guide along an inclined path of travel toward upper rear corner guide pulley 114. The upper guide pulley 114 is journaled on pin 115 and disposed on a spacer element 116 so as to be in horizontal alignment with the upper coaxial tape reel. Again the taper of the pulley 114 is reversed to that of the pulley 112 so as to cause the tape to return to a horizontal path of travel for movement onto the upper take-up roll. In the modified form, the pins are disposed on vertical axes parallel to the spindle axis of the reels with the inclined paths of travel for the tape established by the conical guide surfaces on the guide pulleys, as a result of which the tape can be advanced by the pulleys across the transducer without removal from the cartridge in the same manner as described with reference to the preferred form. In this connection it will be observed that in either form of invention the tape T may be driven in either direction so that for example the upper reel may act as the supply reel and the lower reel as the take-up reel and the guide pulleys will function in the same manner to effectively guide movement of the tape between reels as described.

Although the present invention has been described with a certain degree of particularity, it is understood that the present disclosure has been made only by way of example and that changes in details of structure and system components may be made without departing from the spirit thereof.

What is claimed is:

1. In a tape transport assembly having a tape cartridge provided with coaxial take-up and supply reels, a recording medium windable across an open end of said cartridge in a direction parallel to disposition of the medium on said reels, and drive means operative to rotate said reels for winding and unwinding said medium between said reels, the improvement comprising:

a tape deck including a tape cartridge-receiving housing provided with an upwardly directed guide passage having an entrance for insertion and removal of said tape cartridge into and from said housing, a transducer, a capstan drive, and a tape tensioner mounted within said housing at one end of said guide passage opposite to the tape cartridge entrance, and yieldable means within said housing engageable with said tape cartridge upon insertion therein to urge the open end of said tape cartridge in a direction causing said transducer to contact the tape passing across the open end of said cartridge with said capstan drive engaging said tape to cooperate in advancing said tape across said transducer, and said tape tensioner member yieldably engaging said medium in its movement across the open end of said tape cartridge to cooperate in maintaining substantially constant tension thereon.

2. In a tape transport assembly according to claim 1, said housing provided with spaced vertical side walls and a top wall interconnecting the side walls across an open side of said housing adapted to receive the open end of said cartridge, and said guide passage defined by spaced side walls inclining rearwardly and downwardly away from the open side of said housing.

3. In a tape transport assembly according to claim 1, said housing further provided with photosensing means on opposite sides for sensing the beginning and end of a magnetic tape advanced between the reels, and a protection switch selectively engageable when said tape cartridge is inserted into said housing to prevent erasure of information on the magnetic tape by said transducer.

4. A tape transport system comprising in combination:

a tape cartridge having coaxial take-up and supply reels, a recording tape on said reels movable across an open end of said cartridge in a direction parallel to disposition of the tape on said reels, a pinch roller mounted within said cartridge behind the path of travel of said tape across the open end of said cartridge, and drive means operative to reversibly rotate said reels for winding and unwinding said tape between said reels, a tape deck including a tape cartridge-receiving housing, a transducer and a capstan drive mounted on said tape deck, and yieldable means within said housing engageable with said tape cartridge upon insertion therein to urge the open end of said tape cartridge in a direction causing said transducer to contact the tape passing across the open end of said cartridge with said capstan drive engaging said tape and said pinch roller to cooperate in advancing said tape across said transducer, and said housing provided with an upwardly directed guide opening adjacent one end for insertion and removal of said tape cartridge, and said transducer and capstan drive together with a tape tensioner aligned across an open end of said housing opposite to said guide opening, said tape tensioner including a spring-loaded roller yieldably engaging said tape in closely spaced relation to said transducer.

5. A tape transport system comprising in combination:

a tape cartridge having coaxial take-up and supply reels, a recording tape on said reels movable across an open end of said cartridge in a direction parallel to disposition of the tape on said reels, a pinch roller mounted within said cartridge behind the path of travel of said tape across the open end of said cartridge, and drive means operative to reversibly rotate said reels for winding and unwinding said tape between said reels, a tape deck including a tape cartridge-receiving housing, a transducer and a capstan drive mounted on said tape deck, and yieldable means within said housing engageable with said tape cartridge upon insertion therein to urge the open end of said tape cartridge in a direction causing said transducer to contact the tape passing across the open end of said cartridge with said capstan drive engaging said tape and said pinch roller to cooperate in advancing said tape across said transducer, and said tape deck further provided with a timing disk and photosensor beneath the open end of said cartridge to correlate the rate of rotation of said capstan drive with the rate of movement of said tape as it is driven by said tape drive means between said reels.

6. A tape transport system comprising in combination:

a tape cartridge having coaxial take-up and supply reels, a recording tape on said reels movable across an open end of said cartridge in a direction parallel to disposition of the tape on said reels, a pinch roller mounted within said cartridge behind the path of travel of said tape across the open end of said cartridge, and drive means operative to reversibly rotate said reels for winding and unwinding said tape between said reels, said tape cartridge provided with a switch control button on its undersurface, said button movable to a position engageable with a final protect switch to advance said transducer to a position to prevent erasure of data on said tape as it is being rewound onto said supply reel, and a tape deck including a tape cartridge-receiving housing, a transducer and a capstan drive mounted on said tape deck, and yieldable means within said housing engageable with said tape cartridge upon insertion therein to urge the open end of said tape cartridge in a direction causing said transducer to contact the tape passing across the open end of said cartridge with said capstan drive engaging said tape and said pinch roller to cooperate in advancing said tape across said transducer.

7. A tape transport system comprising in combination:

a tape cartridge having coaxial take-up and supply reels, a recording tape on said reels movable across an open end of said cartridge in a direction parallel to the disposition of the tape on said reels, a pinch roller mounted within said cartridge behind the path of travel of said tape across the open end of said cartridge, and drive means operative to reversibly rotate said reels for winding and unwinding said tape between said reels, said tape cartridge provided with an arcuate dust shield interpositioned between the open end of said cartridge and said coaxial take-up and supply reels, and a tape deck including a tape cartridge-receiving housing, a transducer and a capstan drive mounted on said tape deck, and yieldable means within said housing engageable with said tape cartridge upon insertion therein to urge the open end of said tape cartridge in a direction causing said transducer to contact the tape passing across the open end of said cartridge with said capstan drive engaging said tape and said pinch roller to cooperate in advancing said tape across said transducer.

8. A tape transport system according to claim 7, said tape provided with reflective markers adjacent to opposite ends thereof, and said tape deck provided with photosensors in opposite sides of said housing aligned opposite the paths of travel of said tape onto and from said take-up and supply reels for sensing the beginning and end of said tape.

9. In a tape transport system having a tape cartridge and coaxial supply and take-up reels mounted for rotation about a common axis within said cartridge for advancement of a recording tape therebetween, the combination therewith of a capstan drive engageable with the tape to advance same between the reels, guide rollers at spaced intervals within said cartridge arranged to guide the tape across said capstan drive in a path of travel parallel to its direction of travel in passing onto and from said take-up and supply reels, said guide rollers having tape-contacting roller surfaces for guiding advancement of the tape internally of said cartridge from a first inclined path of travel leading from one reel into a guide path parallel to said reels as the tape is advanced across said capstan drive and thereafter following a second inclined path of travel leading onto the other of said reels, said guide rollers further characterized by having a guide roller member at each corner of said tape cartridge, each guide roller member provided with a tape-contacting roller surface disposed at an angle to the reel axis whereby to establish the inclined paths of travel into and away from the guide path along the open end of said tape cartridge, and there being a pair of corner guide rollers in the path of travel between each reel and the guide path along the open end of said tape cartridge, the rollers of each pair disposed for rotation about axes parallel to one another and inclined to the reel axis, the inclination of the roller axes of one pair being equal but opposite to the inclination to the roller axes of the other pair whereby to cause the tape to undergo successive changes in direction of travel between said reels.

10. In a tape transport system having a tape cartridge and coaxial supply and take-up reels mounted for rotation about a common axis within said cartridge for advancement of a recording tape therebetween, the combination therewith of a capstan drive engageable with the tape to advance same between the reels, guide rollers at spaced intervals within said cartridge arranged to guide the tape across said capstan drive in a path of travel parallel to its direction of travel in passing onto and from said take-up and supply reels, said guide rollers having tape-contacting roller surfaces for guiding advancement of the tape internally of said cartridge from a first inclined path of travel leading from one reel into a guide path parallel to said reels as the tape is advanced across said capstan drive and thereafter following a second inclined path of travel leading onto the other of said reels, said tape cartridge further including a pinch roller mounted within said cartridge and engageable with the inner surface of the tape to press said tape into contact with said capstan drive, and an arcuate dust shield mounted within said cartridge between said reels at the open end of said tape cartridge.

* * * * *